United States Patent
Morin et al.

(10) Patent No.: US 10,337,407 B2
(45) Date of Patent: Jul. 2, 2019

(54) LOW NOISE COMPRESSOR FOR GEARED GAS TURBINE ENGINE

(71) Applicant: United Technologies Corporation, Hartford, CT (US)

(72) Inventors: Bruce L. Morin, Springfield, MA (US); David A. Topol, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 754 days.

(21) Appl. No.: 14/774,273

(22) PCT Filed: Feb. 19, 2014

(86) PCT No.: PCT/US2014/017056
§ 371 (c)(1),
(2) Date: Sep. 10, 2015

(87) PCT Pub. No.: WO2014/186017
PCT Pub. Date: Nov. 20, 2014

(65) Prior Publication Data
US 2016/0040598 A1    Feb. 11, 2016

Related U.S. Application Data

(60) Provisional application No. 61/778,638, filed on Mar. 13, 2013.

(51) Int. Cl.
| | |
|---|---|
| *F02C 3/04* | (2006.01) |
| *F02C 7/24* | (2006.01) |
| *F02C 7/36* | (2006.01) |
| *F02K 3/06* | (2006.01) |
| *F02C 3/107* | (2006.01) |

(52) U.S. Cl.
CPC .................. *F02C 7/24* (2013.01); *F02C 3/04* (2013.01); *F02C 3/107* (2013.01); *F02C 7/36* (2013.01);
(Continued)

(58) Field of Classification Search
CPC ...... F02C 7/24; F02C 7/36; F02C 3/04; F02C 3/107; F02C 7/045; F02C 9/16;
(Continued)

(56) References Cited

U.S. PATENT DOCUMENTS 5,156,353 A * 10/1992 Gliebe .................. B64C 21/025
244/130
5,169,288 A    12/1992 Gliebe et al.
(Continued)

FOREIGN PATENT DOCUMENTS

| GB | 1072145 | 6/1967 |
|---|---|---|
| GB | 2199375 | 7/1988 |

OTHER PUBLICATIONS

U.S. Appl. No. 12/622,458, filed Nov. 20, 2009.
(Continued)

*Primary Examiner* — Mark A Laurenzi
*Assistant Examiner* — Mickey H France
(74) *Attorney, Agent, or Firm* — Carlson, Gaskey & Olds, P.C.

(57) ABSTRACT

A gas turbine engine according to an exemplary aspect of the present disclosure includes, among other things, a fan, a compressor section having a low pressure compressor and a high pressure compressor, a combustor section, and a turbine section having a low pressure turbine, the low pressure turbine for driving the low pressure compressor and the fan; a gear reduction effecting a reduction in the speed of the fan relative to a speed of the low pressure turbine and the low pressure compressor; and at least one stage of the compres-
(Continued)

sor section having a ratio of vanes to blades that is greater than or equal to 1.8. The corrected tip speed of the blades is greater than or equal to 480 ft/sec at an approach speed.

20 Claims, 1 Drawing Sheet

(52) U.S. Cl.
CPC ...... *F02K 3/06* (2013.01); *F05D 2260/40311* (2013.01); *F05D 2260/96* (2013.01)

(58) Field of Classification Search
CPC ............... F02C 3/10; F05D 2260/96; F05D 2260/40311; F02K 3/06; F01D 21/00; F01D 17/00; F01D 5/14; F01D 5/16; F01D 25/04; F01D 1/02; B23P 15/00
USPC .................................................. 415/1, 122.1
See application file for complete search history.

(56) References Cited

U.S. PATENT DOCUMENTS

| | | |
|---|---|---|
| 5,478,199 A | 12/1995 | Gliebe |
| 7,806,651 B2 | 10/2010 | Kennepohl et al. |
| 7,891,943 B2 | 2/2011 | Tsuchiya et al. |
| 8,246,292 B1 | 8/2012 | Morin et al. |
| 2008/0022691 A1 | 1/2008 | Kennepohl et al. |
| 2011/0123342 A1 | 5/2011 | Topol |
| 2012/0275922 A1* | 11/2012 | Praisner .............. F01D 9/041 416/223 A |
| 2013/0160454 A1* | 6/2013 | Roberts, II ............ F02C 3/00 60/726 |

OTHER PUBLICATIONS

U.S. Appl. No. 13/590,328, filed Sep. 28, 2012.
U.S. Appl. No. 13/630,276, filed Aug. 21, 2012.
International Search Report and Written Opinion for PCT Application No. PCT/US2014/017056 dated Dec. 10, 2014.
Supplementary European Search Report for Application No. 14798105.4 dated Oct. 7, 2016.
Walther, Rainer, Advanced Engine Technology: Precondition for Economy, Profitability, and Environmental Compatibility in Future Civil Air Transportation, International Conference Aeronautics Research, May 15, 2006, retrieved on Oct. 5, 2016 from the Internet at http://www.dlr.de/aeronautics-conference/Speeches/Session3_Walther.pdf.
International Preliminary Report on Patentability for PCT Application No. PCT/US2014/047056, dated Sep. 24, 2015.

* cited by examiner

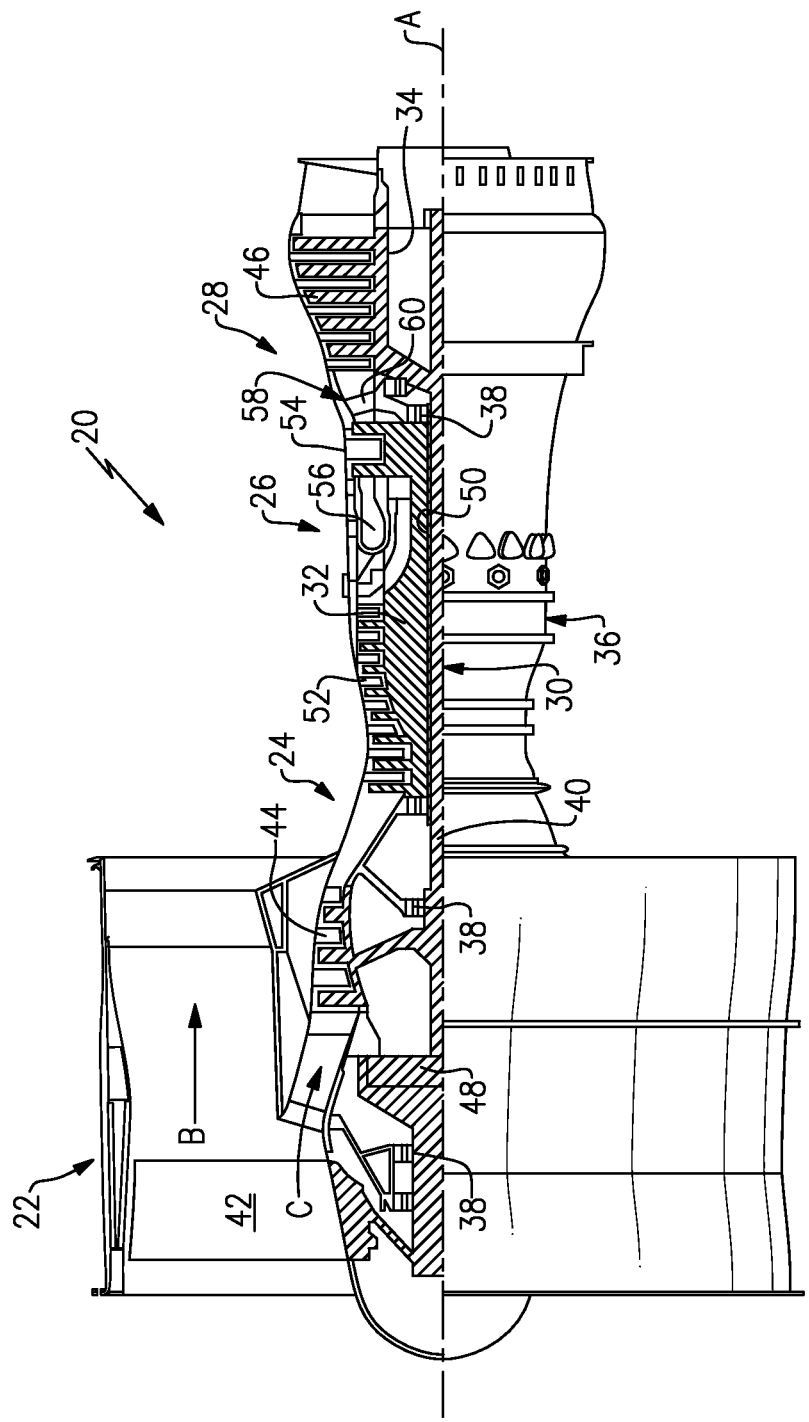

LOW NOISE COMPRESSOR FOR GEARED GAS TURBINE ENGINE

BACKGROUND

This disclosure relates to the design of a lower noise gas turbine engine compressor.

Gas turbine engines are known, and typically include a fan delivering air into a compressor. The air is compressed in the compressor and delivered downstream into a combustor section where it is mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades that rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades that rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

Historically, the low pressure turbine has driven both a low pressure compressor section and a fan section. More recently, a gear reduction has been provided such that the fan and low pressure compressor can be driven at distinct speeds.

SUMMARY

A gas turbine engine according to an exemplary aspect of the present disclosure includes, among other things, a fan, a compressor section having a low pressure compressor and a high pressure compressor, a combustor section, and a turbine section having a low pressure turbine, the low pressure turbine for driving the low pressure compressor and the fan; a gear reduction effecting a reduction in the speed of the fan relative to a speed of the low pressure turbine; and at least one stage of the compressor section having a ratio of vanes to blades that is greater than or equal to 1.8. The corrected tip speed of the low pressure compressor is greater than or equal to 480 ft/sec at an approach speed.

In a further non-limiting embodiment of the foregoing gas turbine engine, the vanes of the at least one stage are immediately upstream or downstream from the blades.

In a further non-limiting embodiment of any of the foregoing gas turbine engines, the gas turbine engine is rated to produce 15,000 pounds of thrust or more.

In a further non-limiting embodiment of any of the foregoing gas turbine engines, the at least one stage comprises a stage of the low pressure compressor.

In a further non-limiting embodiment of any of the foregoing gas turbine engines, the at least one stage comprises each stage of the low pressure compressor.

In a further non-limiting embodiment of any of the foregoing gas turbine engines, the gear reduction has a gear ratio of greater than about 2.3.

In a further non-limiting embodiment of any of the foregoing gas turbine engines, the fan delivers air into a bypass duct, and a portion of air into the compressor section, with a bypass ratio defined as the volume of air delivered into the bypass duct compared to the volume of air delivered into the compressor section, and the bypass ratio being greater than about six (6).

In a further non-limiting embodiment of any of the foregoing gas turbine engines, the bypass ratio is greater than about ten (10).

In a further non-limiting embodiment of any of the foregoing gas turbine engines, the compressor section is a compressor section of a three-spooled gas turbine engine.

A compressor section of a geared gas turbine engine according to an exemplary aspect of the present disclosure includes, among other things, at least one stage of a compressor of a geared gas turbine engine, the at least one stage having a ratio of vanes to blades that is greater than or equal to 1.8. The blades are configured to operate at a corrected tip speed of greater than or equal to 480 ft/sec at an approach speed.

In a further non-limiting embodiment of any of the foregoing compressor sections, the vanes of the at least one stage are immediately upstream or downstream from the blades.

In a further non-limiting embodiment of any of the foregoing compressor sections, the geared gas turbine engine is rated to produce 15,000 pounds of thrust or more.

In a further non-limiting embodiment of any of the foregoing compressor sections, the at least one stage comprises a stage of a low pressure compressor.

In a further non-limiting embodiment of any of the foregoing compressor sections, the at least one stage comprises each stage of a low pressure compressor.

In a further non-limiting embodiment of any of the foregoing compressor sections, the gear reduction has a gear ratio of greater than about 2.3.

In a further non-limiting embodiment of any of the foregoing compressor sections, a fan is configured to deliver air into a bypass duct, and a portion of air into the compressor section, with a bypass ratio defined as the volume of air delivered into the bypass duct compared to the volume of air delivered into the compressor section, and the bypass ratio being greater than about six (6).

In a further non-limiting embodiment of any of the foregoing compressor sections, the bypass ratio is greater than about ten (10).

A method of compression in a gas turbine according to another exemplary aspect of the present disclosure includes, among other things, providing at least one stage of a compressor section of a geared gas turbine engine, at least one stage having a ratio of vanes to blades that is greater than or equal to 1.8. A corrected tip speed of the blades is greater than or equal to 480 ft/sec at an approach speed.

In a further non-limiting embodiment of any of the foregoing methods, at least one stage comprises at least one stage of a low pressure compressor.

These and other features of this disclosure will be best understood from the following specification and drawings, the following of which is a brief description.

BRIEF DESCRIPTION OF THE DRAWINGS

FIG. 1 shows an example gas turbine engine.

DETAILED DESCRIPTION

FIG. 1 schematically illustrates an example gas turbine engine 20 that includes a fan section 22, a compressor section 24, a combustor section 26, and a turbine section 28.

Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure compressor 44. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused partially by a desire to not have unduly high fan speeds.

In geared gas turbine engines, such as the engine 20, a careful design between the number of vanes and blades in the low pressure compressor 44, and the corrected tip speed of the low pressure compressor 44 can be selected to reduce compressor noise through the use of the mechanism called "cutoff." This "cutoff" mechanism occurs when the vane-to-blade ratio is selected such that the fundamental blade passage tone is prevented from propagating to the far-field. This mechanism has been used previously in non-geared engines, which have low pressure compressors that operate at low corrected tip speeds, typically no greater than 480 ft/s. However, "cutoff" has not been used in geared engines, such as those described herein, which have low pressure compressors that operate at high corrected tip speed, typically greater than 480 ft/s. On geared engines with such compressors, the "cutoff" mechanism requires a larger vane-to-blade ratio than it would on non-geared engines. Corrected tip speed of the low pressure compressor is the actual low compressor tip speed in ft/sec divided by an industry standard temperature correction of $[(\text{Tram }° \text{R})/(518.7° \text{R})]^{0.5}$. Corrected tip speed of the high pressure compressor may be calculated in a similar manner. Corrected tip speed for any blade row may be calculated in this manner.

Although described with reference to the two-spool engine 20, the relationship between the number of vanes and blades in the low pressure compressor 44, and the corrected tip speed of the low pressure compressor 44 may be applicable to three-spool engines as well.

In the example engine 20, a ratio of the number of vanes to blades in a stage of the low pressure compressor 44 is greater than or equal to $R_A$. In this example, a corrected tip speed of the low pressure compressor blades in that stage is greater than or equal to $V_A$ at approach speed. In the example engine 20, $R_A$ is about 1.8, and $V_A$ is about 480 ft/sec. This novel design facilitates reducing noise from the low pressure compressor 44 because at least one stage of the low pressure compressor 44 is "cutoff" at its rotor's blade passing frequency.

The stage including the vanes and blades at above $R_A$ can be any stage of the low pressure compressor 44.

The stage may also be a stage of the high pressure compressor 52, or, if present, an intermediate pressure compressor. In a high or intermediate pressure compressor example, $R_A$ may be greater than or equal to 1.8.

It is envisioned that all of the stages in the low pressure compressor 44 (or high pressure compressor 52, or if present, intermediate pressure compressor) would include a ratio of vanes to blades that is greater than or equal to $R_A$. However, this disclosure may also extend to compressors wherein only one of the stages has a ratio of vanes to blades that is greater than or equal to $R_A$. This disclosure also extends to compressors wherein more than one, but less than all, of the stages has a ratio of vanes to blades that is greater than or equal to $R_A$.

The corrected tip speed of the blades is measured at engine operating conditions corresponding one or more of the noise certification points defined in Part 36 of the Federal Airworthiness Regulations. More particularly, the rotational speed may be taken as an approach certification point as defined in Part 36 of the Federal Airworthiness Regulations. For purposes of this application and its claims, the term "approach speed" equates to this certification point. Corrected tip speed is the actual tip speed in ft/sec divided by an industry standard temperature correction of $[(\text{Tram }° \text{R})/(518.7° \text{R})]^{0.5}$.

The disclosed examples are most applicable to jet engines rated to produce 15,000 pounds (66,723 N) of thrust or more.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine, comprising:
   a fan, a compressor section having a low pressure compressor and a high pressure compressor, and a turbine section having a low pressure turbine, the low pressure turbine for driving the low pressure compressor and the fan;
   a gear reduction effecting a reduction in the speed of the fan relative to a speed of the low pressure turbine; and
   at least one stage of the compressor section having a ratio of vanes to blades that is greater than or equal to 1.8, wherein the corrected tip speed of the blades is greater than or equal to 480 ft/sec at an approach speed.

2. The gas turbine engine of claim 1, wherein the vanes of the at least one stage are immediately upstream or downstream from the blades.

3. The gas turbine engine of claim 2, wherein the gas turbine engine is rated to produce 15,000 pounds of thrust or more.

4. The gas turbine engine of claim 3, wherein the at least one stage comprises a stage of the low pressure compressor.

5. The gas turbine engine of claim 1, wherein the at least one stage comprises each stage of the low pressure compressor.

6. The gas turbine engine of claim 4, wherein the gear reduction has a gear ratio of greater than or equal to about 2.3.

7. The gas turbine engine of claim 6, wherein the fan delivers air into a bypass duct, and a portion of air into the compressor section, with a bypass ratio defined as the volume of air delivered into the bypass duct compared to the volume of air delivered into the compressor section, and the bypass ratio being greater than or equal to about six (6).

8. The gas turbine engine of claim 7, wherein the bypass ratio is greater than or equal to about ten (10).

9. The gas turbine engine of claim 7, wherein the compressor section is a compressor section of a three-spooled gas turbine engine.

10. A compressor section of a geared gas turbine engine, comprising:
    at least one stage of a compressor of a geared gas turbine engine, the at least one stage having a ratio of vanes to blades that is greater than or equal to 1.8, wherein the blades are configured to operate at a corrected tip speed of greater than or equal to 480 ft/sec at an approach speed.

11. The compressor section of claim 10, wherein the vanes of the at least one stage are immediately upstream or downstream from the blades.

12. The compressor section of claim 11, wherein the geared gas turbine engine is rated to produce 15,000 pounds of thrust or more.

13. The compressor section of claim 12, wherein the at least one stage comprises a stage of a low pressure compressor.

14. The compressor section of claim 10, wherein the at least one stage comprises each stage of a low pressure compressor.

15. The compressor section of claim 13, wherein the gear reduction has a gear ratio of greater than or equal to about 2.3.

16. The compressor section of claim 15, wherein a fan is configured to deliver air into a bypass duct, and a portion of air into the compressor section, with a bypass ratio defined as the volume of air delivered into the bypass duct compared to the volume of air delivered into the compressor section, and the bypass ratio being greater than or equal to about six (6).

17. The compressor section of claim 15, wherein the bypass ratio is greater than or equal to about ten (10).

18. A method of providing a portion of a gas turbine comprising:
   providing at least one stage of a compressor section of a geared gas turbine engine, at least one stage having a ratio of vanes to blades that is greater than or equal to 1.8, wherein a corrected tip speed of the blades is greater than or equal to 480 ft/sec at an approach speed.

19. The method of claim 18, wherein the at least one stage comprises at least one stage of a low pressure compressor.

20. The gas turbine engine of claim 1, wherein the gas turbine engine is rated to produce 15,000 pounds of thrust or more, the at least one stage comprises a stage of the low pressure compressor, and the gear reduction has a gear ratio of greater than or equal to about 2.3.

* * * * *